Patented Jan. 25, 1949

2,460,256

UNITED STATES PATENT OFFICE 2,460,256

REACTION PRODUCTS OF AN ALDEHYDE WITH ALLYL ETHER OF ANACARDIC MATERIAL

Mortimer T. Harvey, South Orange, N. J., assignor to The Harvel Corporation, a corporation of New Jersey No Drawing. Application January 8, 1945, Serial No. 571,958

13 Claims. (Cl. 260—18)

This invention relates to novel compositions of matter as well as to methods for producing the same. The invention also relates to novel products including one or more of said novel compositions of matter and to methods for making said products. In one of its more specific aspects the invention is directed to novel compositions of matter produced by employing allyl ethers of anacardic material and/or the thickened products obtained by heating said ethers as components of said compositions and also to novel products embodying said compositions. In another of its specific aspects the invention is directed to a base coated and/or impregnated with certain resinous compositions having good solvent resistance.

In my copending application Serial No. 541,850 filed June 23, 1944, now abandoned, I disclose allyl ethers of anacardic material and the thickened products obtained by heating said ethers and also methods for preparing the same. In the following description and claims, the term "anacardic material" designates any one of the following: cashew nut shell liquid, distillates from cashew nut shell liquid and residues from cashew nut shell liquid and also the polymers thereof.

The cashew nut shell liquid may be the raw cashew nut shell liquid obtained by the solvent extraction of said liquid from the cashew nuts or by the extraction of said liquid from said nuts by the use of a hot cashew nut shell liquid bath as set forth in the U. S. patent to E. R. Hughes, No. 2,058,456 of October 27, 1936, or it may be the so-called treated cashew nut shell liquid obtained after the raw cashew nut shell liquid has been treated to reduce its vesicant action and to remove the naturally occurring metals therein as set forth in the patent to Damitz-Harvey No. 2,128,247 of August 30, 1938 and to Harvey-Damitz, No. 2,067,919 of January 19, 1937 to which reference is hereby made, or it may be either the raw or treated cashew nut shell liquid which has been steam distilled or distilled under vacuum at about 500° F.–600° F. to remove the more volatile constituents which measure about 5% by weight of the liquid treated.

The distillates and residues from cashew nut shell liquid may be obtained by distilling cashew nut shell liquid. The preferable manner of obtaining these products is to distill the cashew nut shell liquid at elevated temperatures. In commercial production, the cashew nut shell liquid may be either gas or vapor and for example steam distilled preferably at between 600° F.–700° F. or distilled under sub-atmospheric pressure conditions and preferably below about 50 mm. of mercury pressure and temperatures between about 400° F.–700° F. When distilled under reduced pressure of about 50 mm. of mercury we prefer to employ temperatures between about 525° F. and 700° F. and when distilled under reduced pressure of about 10 mm. of mercury we prefer to employ a temperature of about 450° F. By whatever method employed, the distillation is continued until the quantity by weight of the distillate is between about 25% to about 75% of the quantity by weight of the cashew nut shell liquid and the quantity by weight of the residue is between about 25% to about 75% of the quantity by weight of the cashew nut shell liquid. The distillates thus obtained for the most part consist of a phenol having an unsaturated hydrocarbon substituent having more than 13 carbon atoms and having a boiling point of approximately 225° C. at 10 mm. of mercury pressure. Of these distillates we prefer to employ those produced by vacuum distillation, thus eliminating the use of steam or the like.

The polymerized cashew nut shell liquid may be prepared by whatever method is desired but for purposes of illustration reference is hereby made to the Harvey-Damitz Patents No. 2,128,247 of August 30, 1938 and 2,240,038 of April 29, 1941. The distillates and the residues may be polymerized in any desired manner and for purposes of illustration reference is made to the patents to S. Caplan, No. 2,292,611 of August 11, 1942 and 2,317,585 of April 27, 1943. By following the teachings of said patents I may prepare fusible polymers of said anacardic materials and said polymers may be used in the manner set forth herein.

These ethers may be produced by reacting an allyl compound with one or a combination of two or more of said anacardic materials. The reaction may be carried out at atmospheric or superatmospheric pressure. The allyl compounds which I prefer to employ are the allyl esters such as allyl chloride, allyl bromide, allyl iodide, allyl sulfate, etc. Of the allyl esters now on the market, I prefer to employ the allyl chloride because of its relatively low cost and normal availability. The reaction of the allyl esters with the anacardic material may be easily and readily carried out by heating a mixture of an anacardic material, an allyl ester and an alkali. The reaction may be carried out under aqueous or non-aqueous conditions. This mixture is preferably heated under a reflux condenser for a period of time, then it is neutralized with an acid. The water and salt are removed from the allyl ether of the anacardic material therein. In some cases a solvent, inert to the reactants, may be employed in the reaction mixture. The use of such a solvent it particularly useful in those cases where the consistency of the anacardic material is so heavy that it is difficult to obtain a fairly uniform mixture of reactants and to inhibit emulsification.

Examples A to D are illustrative examples of methods for making these ethers:

EXAMPLE A 300 grams of cashew nut shell liquid
100 grams of allyl chloride
53 grams of sodium hydroxide dissolved in 150 grams of water The aqueous solution of sodium hydroxide was added to the cashew nut shell liquid and this mixture was stirred to provide a homogeneous mass. The allyl chloride was then added slowly with stirring and the mixture was heated under a reflux condenser. This mixture is maintained in the state of boiling for about three hours. Then the resultant mass is neutralized and allowed to stand whereupon the mass separates into a watery layer and an oily layer. The oily layer contained the allyl ether of cashew nut shell liquid and is separated from the watery layer. The oily layer may then be heated under a vacuum to dehydrate the same. This oily layer, which for the most part is the allyl ether of cashew nut shell liquid did not react to any material degree with hexamethylene tetramine when a mixture thereof in the ratio of 10 parts of the former to one of the latter was kept in an oven at 100° C. for 16 hours.

EXAMPLE B 300 grams of distillate from cashew nut shell liquid (boiling point approx. 225° C. at 10 mm. of mercury pressure and prepared by distilling cashew nut shell liquid at a temperature of about 450° F. and reduced pressure of 10 mm. of mercury)
100 grams of allyl chloride
53 grams of sodium hydroxide in 150 grams of water The caustic and water are dissolved together first and added to a mixture of distillate and allyl chloride. The caustic-water solution is added very slowly through the top of a reflux condenser. After all the caustic has been added the reaction is continued by boiling for at least 2 hours. Then the mass is neutralized and allowed to stand whereupon an oily layer rises to the top and the salt and water solution is at the bottom. This mixture may be placed in a separatory funnel and the water solution removed from the bottom and the upper oily layer is washed with hot water two times. The oily layer which is chiefly the allyl ether of said distillate may then be dehydrated in an open kettle by heating to approximately 130° C. The specific gravity of the product is .932 at 25° C., and the index of refraction 1.508 at 25° C.

EXAMPLE C 200 grams of polymerized cashew nut shell liquid having a viscosity of 60,000 cp. at 25° C.
200 grams of xylol
100 grams of allyl chloride are mixed together to make a clear solution. To this is added through a reflux condenser an alkaline solution of 55 grams NaOH in 200 grams of water. The addition of the alkali is accomplished slowly and with stirring between each addition. The mixture is then heated to boiling for two hours, then neutralized with dilute mineral acid. The resultant product contains the allyl ether of polymerized cashew nut shell liquid.

EXAMPLE D 200 grams of residue from cashew nut shell liquid
400 grams of xylol
100 grams of allyl chloride are mixed together to make a clear solution. To this is added through a reflux condenser an alkaline solution of 55 grams of NaOH in 200 grams of water. The addition of the alkali is accomplished slowly and with stirring between each addition. The mixture is then heated to boiling for 2 hours, then neutralized with dilute mineral acid, washed thoroughly with water and dehydrated to remove moisture and neutral solvent. The resultant viscous liquid, is chiefly the allyl ether of cashew nut shell liquid residue.

The allyl ethers of anacardic materials may be thickened or polymerized by the application of heat and this action may be promoted by adding thereto a peroxide such as benzoyl peroxide, sodium peroxide, tertiary butyl hydro-peroxide, lauryl peroxide, hydrogen peroxide or the like.

While the thickened products of said allyl ethers of anacardic material may be produced by agitating the same in the open air at room temperature, a very long period of time is required to produce said thickened products under these conditions especially when said ethers are in mass or in commercial batches. In the commercial production of these fusible thickened products of said allyl ethers of anacardic material these ethers are heated above 200° F. and as high as desired and for a sufficient time until thickened products of the desired consistency are produced. Generally in factory production, the temperature employed is between about 350° F. and 650° F. and preferably between about 500° F. and 650° F. While maintained at said temperature the ether is preferably agitated either in the presence or absence of a free oxygen containing gas and/or a peroxide such as benzoyl peroxide, tertiary butyl-hydro-peroxide, lauryl peroxide, hydrogen peroxide and the like. When there is employed the allyl ether of cashew nut shell liquid or the allyl ether of a distillate of cashew nut shell liquid, which distillate is produced by distilling under reduced pressure and preferably below 50 mm. of mercury pressure, and at temperatures between about 450° F. and 700° F., the temperature employed to produce said thickened products is preferably between about 500° F. to 650° F. and the mass is maintained at said temperature until the viscosity of the mass has increased to at least 5,000 centipoises at 25° C. The heating may be continued and may be terminated just prior to when the product reaches the infusible solid state and it is preferably terminated to provide a thickened fusible product whose viscosity is between about 5,000 and 100,000 centipoises at 25° C.

While these ethers of said anacardic materials are reactive with aldehydes, such as formaldehyde, paraformaldehyde, furfuraldehyde, trioxymethylene, glyoxal, acetaldehyde, acrolein, polymerized acrolein, or the like, or a substance such as hexamethylene tetramine capable of yielding an aldehyde I prefer to employ temperatures above 250° F. in carrying out this reaction. I have discovered that said fusible thickened products obtained by treating and preferably heating said allyl ethers of said anacardic materials in the aforesaid manners are reactive with any one or a combination of two or more of said aldehydes at lower temperatures. The temperature which I prefer to employ in carrying out this reaction is preferably between 175° F. and 250° F. and I have found that these reaction products are considerably harder than the solid products obtained by converting said ether to the solid state by the application of heat alone.

The thickened products of said ethers of anacardic materials which I prefer to employ, and particularly in said reaction, are those which are fusible thermosetting resins whose viscosities are above about 5,000 centipoises at 25° C. and may be even as high as 100,000 centipoises depending upon the starting anacardic material; when the thickened products produced by heating allyl ether of cashew nut shell liquid or one of said distillates are so employed, I prefer to use those having viscosities between about 5,000 to 20,000 centipoises at 25° C.; but when the thickened products produced by heating allyl ethers of the residue or the various polymers mentioned herein, are so employed the viscosity may be as high as and in some cases above 100,000 centipoises at 25° C.

The quantity of aldehyde to said heat thickened product may be between about ¼ mole to 2 moles of aldehyde to each 350 parts by weight of said thickened product and moreover the reaction may be carried out under acidic or alkaline conditions and preferably at temperatures above room temperature and above about 175° F. and between about 200° F. and 250° F. A condensing catalyst, such as sulphuric acid, diethyl sulphate, hydrochloric acid, ammonia or the like may be used and may measure about 1% of the mixture by weight. When hexamethylene tetramine is used no additional condensing agent need be employed. The heating may be continued to provide a fusible thermosetting resinous organic condensation reaction product which upon further heating at said temperature may be converted to the substantially solid and infusible state.

Said allyl ethers of said anacardic materials as well as the fusible heat thickened products thereof may be modified in other ways if desired. For example, they may be halogenated by passing a halogen gas into the same whereupon the gas is absorbed thereby. Since chlorine gas is normally plentiful and therefore cheap, it is preferably used. When the allyl ether of cashew nut shell liquid or of said distillates is employed, the chlorine may be passed directly into a mass of the same and may be continued until no more chlorine is absorbed thereby or this chlorination may be terminated at any other time. This chlorination may be carried out by maintaining said ether at a temperature of about 100° F. Instead of adding the chlorine directly to the ether being chlorinated, it may be added to a solution of said ether in an inert solvent, such as "Varnolene," therefor. While the allyl ethers of cashew nut shell liquid and the distillates may be chlorinated while in solution, I prefer to use solutions when chlorinating said ethers of said polymers and residues and also the thickened fusible products produced by heating any of said ethers because of their viscosity characteristics. The chlorinated products thus produced are capable of being reacted with any one of said aldehydes to produce solid infusible resinous products. These end products may be produced in the same manner as are the end products produced by reacting the unhalogenated thickened products with one of said aldehydes.

Said allyl ethers of said anacardic material and the thickened products produced by heating said ethers may be sulphurized by reacting one or a combination of two or more of them with sulphur, sulphur chloride, sodium polysulphide or the like. These sulphurized reaction products may be milled alone or in combination with a rubbery material such as natural rubber or one of said so-called synthetic rubbers. These sulphurized reaction products may serve as extenders, plasticizers and also as vulcanizing agents for said rubbery materials, and further serve to impart certain advantageous characteristics thereto.

Said allyl ethers of anacardic materials, the thickened products thereof produced by heating said ethers, products produced by either sulphurizing or chlorinating said ethers and said thickened products and also the resinous organic condensation reaction products of one of said aldehydes with any one of said thickened products and said chlorinated or sulphurized products find application in various and sundry fields. They may be used either alone or in combination with other substances in the art of paints, varnishes, electrical insulations, coatings, laminations, brake linings, moldings, rubber, both natural and synthetic, adhesives, inks and the like. They may be used as a coating and/or impregnating medium for a base such as paper, metal, "Cellophane," wood, glass, cork, etc. In the paint and varnish field any one of them may be added directly to the other constituents thereof or if desired may be substituted for one or more of the oily constituents thereof. A mixture of one or more of them together with a heat polymerizing oil such as China-wood oil, oiticica oil, perilla oil or the like, or with a semi-drying or non-drying oil such as cottonseed oil, fractionated cottonseed oil, soya bean oil, linseed oil, fish oils such as Menhadden and the like, or other oily matter such as the residues of cottonseed oil, soya bean oil and linseed oil described in Patents No. 2,366,525 and 2,366,526 to Schaufelberger-Harvey issued January 2, 1945 and application Serial No. 476,490 filed February 19, 1943 may be heat bodied to the desired consistency and used as a paint and varnish vehicle and also as impregnating and/or coating compositions.

As a coating or impregnating medium on a base, they impart good electrical insulation properties such as stability of power factor at 150° F. and dielectric strength. They may be used with natural, reclaimed or any of the so-called synthetic rubbers commercially known as "Neoprene," "Buna-S" or "Buna-N," also known respectively as the rubbery polymers of 2,chlor butadiene, rubbery copolymers of butadiene and styrene and rubbery copolymers of butadiene and acrylonitrile. They may also be used with styrene, methyl methacrylate and the like and combinations of this type may be converted to the solid state.

The following examples are set forth merely for the purposes of illustrating the invention and are not in a limiting sense.

Methods for Producing Thickened Products and Products Obtained by Heating Said Allyl Ethers of Anacardic Materials to Provide Fusible Resinous Compositions

Example I

Any one of said allyl ethers of one of said anacardic materials is heated above about 450° F. and preferably between 500° F. to 650° F. until the resultant product has the desired viscosity and is a fusible resinous product capable of reacting with formaldehyde at about 250° F. to provide an infusible resinous organic condensation reaction product. This product is hereinafter known as product I and is capable of being dissolved in petroleum spirits known as "Varnolene," turpentine, xylol or mixtures thereof.

Example II 100 parts of allyl ether of cashew nut shell liquid is heated in an open vessel to a temperature between about 500° F. and 600° F. until the resultant mass is a thickened fusible resinous product whose viscosity is above 5,000 and may be as high and higher than 100,000 centipoises at 25° C. This product is hereinafter known as product II.

Example III 100 parts of allyl ether of a distillate of cashew nut shell liquid, which distillate has a boiling point of approximately 225° C. at 10 mm. of mercury pressure and is a phenol containing an unsaturated hydrocarbon substituent with more than 13 carbon atoms, is placed in an open vessel and heated to a temperature between about 500° F. and 600° F. until the resultant mass is a thickened fusible resinous product whose viscosity is above 5,000 and may be as high and higher than 100,000 centipoises at 25° C. This product is hereinafter known as product III.

Example IV 100 parts of allyl ether of cashew nut shell liquid is heated in a closed vessel, in the absence of a free oxygen containing gas and in an ambient of an inert medium such as $CO_2$ to a temperature between about 500° F. and 600° F. until the resultant mass is a fusible resin whose viscosity is above 5,000 centipoises at 25° C. This product is hereinafter known as product IV.

Example V 100 parts of allyl ether of a distillate of cashew nut shell liquid, which distillate has a boiling point of approximately 225° C. at 10 mm. of mercury pressure and is a phenol containing an unsaturated hydrocarbon substituent with more than 13 carbon atoms, is heated in a closed vessel, in the absence of a free oxygen containing gas and in an ambient of an inert medium such as $CO_2$, to a temperature between about 500° F. and 600° F. until the resultant mass is a fusible resin whose viscosity is above about 5,000 centipoises at 25° C. This product is hereinafter known as product V.

Methods for Modifying Said Allyl Ethers of Anacardic Material to the Dry Solid State and Products Produced Thereby

Example VI

Any one of said allyl ethers of one of said anacardic materials is placed in a vessel and in the presence or absence of a free oxygen containing gas, said mass either in the absence or presence of one of the before mentioned peroxides which may measure between about 5% and 10% by weight based on the weight of the ether, and with or without agitation, is heated to a temperature of at least 450° F. and preferably between 500° F. and 650° F. Said mass is maintained at said temperature until it has been converted to a solid infusible resinous composition. This product is hereinafter known as product VI.

Example VII 300 parts by weight of one of said allyl ethers of one of said anacardic materials is mixed with between ¼ and 2 moles of one of the aforementioned aldehydes and with a small quantity of an acidic or alkaline condensation catalyst and is heated at temperatures between about 250° F. and 650° F. to provide a fusible resinous organic condensation reaction product, known as product VII which upon continued heating at said temperatures may be converted to the solid infusible state.

Example VIII

Any one of the heat thickened products produced in accordance with Example I may be mixed with a quantity of one of said aldehydes in the ratio of about ¼ mole to 2 moles of said aldehyde for each 350 parts by weight of said thickened product, a small quantity of an acidic or alkaline condensing agent and thereafter heated above about 175° F. and between about 200° F. and 250° F. to provide a fusible resinous organic condensation reaction product hereinafter known as product VIII which upon further heating at said temperature may be converted to the solid infusible state.

Example IX 350 parts of the thickened product obtained in accordance with either Examples II, III, IV, or V is mixed with between about ¼ mole to 2 moles of one of the aforementioned aldehydes and a small quantity of a condensing agent and this mixture is heated above 175° F. and preferably between 200° F. and 250° F. to provide a fusible organic condensation resinous composition hereinafter known as product IX which upon heating at said temperatures may be converted to the solid infusible state.

Example X 200 grams of allyl ether of cashew nut shell liquid is mixed with 20 grams of sulphur and this mass is heated to about 425° F. and maintained at that temperature whereupon a reaction takes place and the reaction product is a substantially sold sticky mass which when placed in an oven at 205° F. overnight becomes a dry substantially solid rubbery mass which may be milled either alone or with natural or any one of the synthetic rubbers hereinbefore referred to.

Example XI

Any one of said allyl ethers of one of said anacardic materials or one of the thickened products made according to Examples I to V inclusive may be polymerized to the solid infusible state by employing an acidic agent such as sulphuric acid or a dialkyl sulfate such as diethyl sulfate or the like. In carrying out this process there is first formed a mixture of a comparatively large amount of sulfuric acid or diethyl sulfate with one of said ethers and this mixture may be heated to about 100° C. and maintained at this temperature until the mass has been converted to the substantially solid and infusible state. The amount of sulfuric acid which may be employed may be about 10% by weight based upon the weight of the ether admixed therewith. When diethyl sulfate is employed, between 15 and 20 parts by weight of diethyl sulfate is in the mix for each 100 parts of said ether or thickened product.

METHODS OF THICKENING OILS AND PRODUCTS PRODUCED THEREBY

Example XII

Any one of said allyl ethers of one of said anacardic materials or any one of the thickened products thereof such as those set forth in Examples I to V inclusive, or any one of the fusible condensation products set forth in Examples VII to IX inclusive, may be mixed with an oil such as China-wood oil, oiticica oil, cottonseed oil, fractionated cottonseed oil, soya bean oil, linseed oil or a fish oil, preferably in the proportions of between 1 of the former to 10 of the latter and 10 of the former to 1 of the latter. This mixture may be heated preferably at a temperature of about 500° F. to 600° F. in order to thicken the same to the desired viscosity or body. This bodied combination may be employed as a paint or varnish base or if desired it may be applied directly to a base to be coated and there may be included therewith when so used a drier such as litharge, copper oleate, manganese resinate or any of the others heretofore employed as driers in the paint and varnish field. If desired these bodied combinations may first be thinned with a solvent such as Varnolene (petroleum solvent), turpentine, xylol or a mixture thereof and then said solutions may be employed as a coating composition onto a base. After the base has been impregnated and/or coated with one of said combinations, with or without a solvent and with or without a drier, the so-coated and/or impregnated base may be placed in an oven maintained at a temperature of 250° F. to 350° F. to convert the coating and/or impregnating composition to a substantially dry solid mass.

COATING AND/OR IMPREGNATING PRODUCT AND METHODS FOR PREPARING THE SAME

Example XIII

Any base, as for example metal, glass, wood, paper, asbestos, cotton or the like may be coated and/or impregnated with a solid product produced by heating (a) any one of said allyl ethers of said anacardic materials examples of which are disclosed in Examples A to D, (b) any one of the fusible thickened products produced by heating an allyl ether of one of said anacardic materials examples of which are products I-V inclusive; (c) any one of the fusible organic condensation reaction products of one of the aforementioned aldehydes and one of the fusible thickened products of (b) examples of said condensation products being products VII, VIII and IX; (d) any one of the products of (a), (b) or (c) modified in any desired manner by the addition of other materials such as one of the oils herein set forth and/or a metallic drier and/or an oil soluble phenol-aldehyde resin such as those employed in the paint and varnish fields, or a normally solid polyvinyl acetal, such as polyvinyl butyral, polyvinyl formal, and/or ethyl cellulose. If the impregnating and coating materials above set forth are not too thick or are not too heavily bodied, the base to be coated may be immersed directly therein to coat and/or impregnate the same. However, if any of said coating and/or impregnating compositions or combinations are too heavy for immersion processes, they may be first dissolved in a solvent such as Varnolene, turpentine or xylol to provide a solution of the desired thinness and the base to be coated and/or impregnated is immersed therein. By whichever method employed, after the coating and/or impregnating has taken place the coated and/or impregnated base is removed from the bath and heated to a temperature of approximately 200° F.-250° F. in order to convert the coating and/or impregnating material into a substantially dry solid mass.

Example XIII 3 to 4 mil cotton cloth may be immersed in an allyl ether of cashew nut shell liquid bath or of one of said distillates, removed therefrom and then cured in a vertical tower at temperatures ranging upwardly to 300° F. in approximately 30 minutes even without employing driers or other ingredients therewith. When said allyl ether of cashew nut shell liquid or one of said distillates is spread in a thin film on a metal base such as copper or other metallic electrical conductors the so-coated base having this coating thereon may be placed in an oven maintained at 280° F.-300° F. for about 20-45 minutes to convert said coating to the dry solid state and to provide a coating having good electrical insulating properties. If desired the allyl ether of cashew nut shell liquid or of one of said distillates may be heated to between about 500° F.-600° F. until the same has been bodied considerably and if desired up to and slightly below the solidification point, then this mass is cooled and thinned with a petroleum solvent such as Varnolene to provide a solid content of around 50%-70%. To this thinned product may be added one of the aforementioned driers and one or more pigments to obtain either fast baking enamels or air drying varnishes and paints, the quantity of drier in part determining the speed of drying. When no drier is employed, the product is preferably employed as a slower baking enamel. Oil soluble phenol-aldehyde resins may be added alone to any one of said ethers of said anacardic materials or in combinations with one of said oils heretofore mentioned.

Example XIV

To the thickened products XII or XIII may be added any one of said aldehydes and preferably hexamethylene tetramine. This mixture may be spread on a base to be coated and this coated base may be placed in a drying oven at about 250° F.-300° F. and converted to a relatively hard solid dry coating having good chemical resistance.

Example XV

Between 2 to 4 parts by weight of any of the allyl ethers of any of said anacardic materials is heated to about 300° F. and there is added thereto about one part of ethyl cellulose (ethoxy content between 44% and 51%). This mixture is held at this temperature for approximately one hour until solution or dispersion takes place. This resultant product is then poured into pans and allowed to cool to room temperature to provide a gelatinous mass or gel. This gel may be milled into rubber, "Neoprene," "Buna-N" or "Buna-S" in ratios up to 2 parts of the latter to one of the former in order to impart, after the usual curing operation, increased resistance against heat deterioration. These gels may also be dissolved in a suitable solvent such as a combination of 1 part of xylol and 1 part of alcohol and this solution may be employed as a coating and/or impregnating composition for cloth, metal, paper and the like. The gel may also be thinned with a quantity of petroleum oil having a relatively low vapor pressure to provide a solution for hot dip coatings for metal parts. In either case the coated compositions are cured to the solid state by heating at about 250° F.–300° F.

*Example XVI*

30 parts by weight of the allyl ether of cashew nut shell liquid or any one of said distillates, 10 parts by weight of solid polyvinyl butyral, 30 parts of xylol, 30 parts of alcohol. The above components in the aforesaid proportions may be dissolved together and this solution with or without one of the aforementioned driers is preferably used as a coating composition for metals which coated metallic base may be placed in a dry oven for ½ to 2 hours, at 200° F.–300° F. to provide a base having a flexible rubbery chemical resistant coating thereon.

METHODS FOR PREPARING FRICTION MATERIALS, BRAKE LININGS AND RESULTANT PRODUCTS

Friction materials, suitable for brake linings, clutch facings or the like, that are extensively used, ordinarily comprise heat resistant fibers, such as asbestos fibers and material for binding the fibers and for modifying the friction thereof. The asbestos fibers may be in any desired form and generally are in woven, matted or felted form. According to this invention the heat resistant fibers are associated with certain materials to provide novel combinations especially suitable for brake linings, clutch facings and the like.

The asbestos fibers may be associated with allyl ethers of anacardic material, with the thickened products obtained by heating the allyl ethers of anacardic material, with the reaction products of an aldehyde having a reactive methylene group such as formaldehyde, paraformaldehyde, acetaldehyde, glyoxal, trioxymethylene, furfuraldehyde, acrolein, polymerized acrolein, or the like and the thickened products obtained by heating the allyl ethers of anacardic material. Said thickened products are fusible and have a viscosity above about 5,000 centipoises at 25° C. Any of the aforementioned products may be combined with said asbestos fibers and are cured preferably by heating to the substantially dry and solid state to provide improved friction elements. If desired, in addition thereto, there may also be associated with said asbestos fibers one or more of the following: (a) resins, such as the well known oil soluble phenolaldehyde resins which in their fusible state are soluble in heat polymerizable oils and examples of which are the resinous condensation reaction products of an aldehyde such as formaldehyde with a phenol such as para tertiary butyl phenol, para tertiary amyl phenol, the two para tertiary hexyl phenols, para phenyl phenol, carvacrol, xylenols, para cresol, mixtures of para cresol with ortho cresol and meta cresol and commercial phenols and mixtures of phenols which upon condensation with a reactive methylene group give oil soluble condensation products, cashew nut shell liquid, marking nut shell liquid, Japanese lac, and their several characteristic phenolic components and derivatives such as anacardic acid, cardol, anacardol, urushiol, cardanol and other similar phenols found in or derived from the plants of the Anacardiaceae family, and phenols generally which have unsaturated hydrocarbon side chains and which, with a reactive methylene group, give condensation products soluble in or dispersible with fatty oils and curable therewith by heating to a dry, oil resistant form; (b) heat polymerizable and drying oils, such as China-wood oil, oiticica oil, perilla oil, soya bean oil, linseed oil, or the like; (c) rubber materials such as natural or reclaimed rubber, the so-called "synthetic rubbers" known as "Neoprene," "Buna-N," and "Buna-S" and respectively being essentially the rubbery polymers of 2-chlor butadiene, rubbery copolymers of butadiene and acrylonitrile and the rubbery copolymers of butadiene and styrene; (d) normally solid polyvinyl acetals such as polyvinyl butyral, polyvinyl formal; (e) ethyl cellulose; (f) sulphur; (g) barytes; (h) carbon black and the like. Said aforementioned products with or without said additions may be employed with asbestos fibers either as binders and friction augmenting materials and/or as friction augmenting materials, preferably in comminuted form and carried by the binder of said fibers to provide novel and improved brake linings.

*Example XVII*

A length of woven or pressed, felted or matted asbestos of the desired dimensions and of the type commonly employed in the production of brake linings is first de-aerated and dehydrated and then soaked in a bath of an allyl ether of an anacardic material to coat and/or impregnate the fibers thereof. This may be accomplished by placing a length of said material in a chamber which is heated and maintained under vacuum, then into said chamber is added an allyl ether of cashew nut shell liquid which is maintained therein under pressure of about 100 lbs. per square inch and at a temperature of about 75° F.–200° F. The viscosity of said ether is preferably low and may be between about 200 to 600 centipoises at 25° C. Then after about 1 to 2 hours of soaking the excess ether is removed and the ether soaked asbestos material is allowed to drain overnight. Subsequently it is cured for about 24 hours in a temperature graduated oven starting at about 150° F. and reaching about 350° F. in that time. Upon removal from the oven and allowed to cool to room temperature, this cured, coated and/or impregnated material will be found to be substantially dry, may be readily cut into the desired lengths and is sufficiently flexible to be formed around a brake drum and provides an improved brake lining. Said allyl ether will be found to have been converted to a substantially dry, infusible and solid resinous composition having good frictional properties.

If desired, said soaking bath may be made thinner by the addition of a solvent such as a petroleum solvent such as "Varnolene" thereto. When a solvent is employed, the soaked material after draining is preferably subjected to a heating operation to remove the solvent therefrom before curing. Instead of using allyl ether of cashew nut shell liquid in said bath, I may use a heat thickened product of allyl ether of cashew nut shell liquid and when the latter is employed, I prefer that it be in solution with a solvent such as "Varnolene." If desired, one or more of the aforementionel aldehydes may be distributed or dissolved in said solution. Whatever type of soaking bath is employed, there may also be included therein a quantity of an oil soluble heat reactive phenol-aldehyde resin, and preferably thermosetting heat reactive substituted phenol-formaldehyde resin and the quantity by weight of said resin added thereto may be between about 10% to 80% based on the quantity by weight of said ether or thickened product of said ether therein. The use of said phenol-aldehyde resin therein imparts increased hardness to the resultant cured brake lining. To impart increased softness, there may be employed the same quantity of one of said heat polymerizable and drying oils in place of said phenol-aldehyde resin.

Instead of omitting all of the phenol-aldehyde resin, said bath may contain both said oils and said resin. In this case there may be prepared a solution of one of said phenol-aldehyde resins in said oil, with the ratio of the quantity of said resin in said oil being between about 25 to 100 and 75 to 25. The solution may be obtained by heating a mixture of said resin and said oil at a temperature of approximately 150° F. until solution is completed. The ratio of the amount of said resin-oil solution in said bath to the quantity of the ether and/or thickened products obtained by heating said ethers may be between about 25 to 100 and 75 to 25. Also included in any one of said baths and with or without said phenol-aldehyde resins and/or said oils and/or said aldehydes may be a quantity of a normally solid polyvinyl acetal, such as polyvinyl butyral, polyvinyl formal or the like, with the ratio by weight of the quantity of ether and/or the thickened products produced by heating said ethers to the quantity of the polyvinyl acetal being between about 1 to 100 and 12 to 100.

If desired, there may also be included in said bath a quantity of various other materials heretofore mentioned. In any of the combinations of materials as set forth, the final product after curing at the aforementioned curing temperatures results in an improved brake lining of asbestos fibers and a binder which is a substantially dry, solid, infusible resinous composition having good frictional properties.

*Example XVIII*

Instead of employing a length of said asbestos material to be impregnated and/or coated with said materials as set forth in Example XVII, a batch of asbestos fibers may be added directly thereto, mixed therewith, shaped and cured. 100 parts of allyl ether of anacardic material and preferably of cashew nut shell liquid or preferably of a heat thickened product thereof having a viscosity between about 5,000 to 20,000 centipoises at 25° C., 100 parts of a solvent for said ether or the heat thickened product thereof, such as petroleum spirits known as "Varnolene," and 8 parts of one of said aldehydes, preferably a formaldehyde yielding substance such as hexamethylene tetramine. These ingredients are placed in a mixer of the dough or cake type and subjected to a mixing operation until there is a solution or substantially uniform distribution of these components with respect to each other. Then to said mass is added 200 parts of asbestos fiber together with additional "Varnolene" of such quantity that mixing may be done with comparative ease. Any of the other ingredients set forth in Example XVII may be added thereto and preferably in the proportions indicated therein and mixed therewith to provide a substantially uniform mix. After complete mixing the mass is removed from the mixer, the solvent is evaporated therefrom at temperatures of about 120° F. to about 140° F. and then is rolled or extruded into ribbons of the proper thickness and width and these ribbons are cured in temperature graduated ovens between about 150° F. to 400° F. for a period of about 25 hours. After curing these ribbons may be cut and ground to the desired dimensions to provide brake linings having matted asbestos fibers with a binder therefor which has good frictional properties and which is substantially dry, solid and infusible composition.

100 parts of rubber may be milled on a rubber mill and in the course of said milling there may be added thereto between 10 to 200 parts of a product having a viscosity between 5,000 and 20,000 centipoises at 25° C. and obtained by heating the allyl ether of cashew nut shell liquid. The milling is continued until there is a substantially uniform distribution of said thickened product into said rubber. Then this milled product may be cut in small pieces and placed in a swelling agent such as "Varnolene." After standing for about from 1 to 3 days in said "Varnolene" a fluid gelatinous mass is obtained. This mass may then be mixed with asbestos, sulphur and the usual rubber accelerators in the proportion of about 3 parts of asbestos to 1 of said solids in said mass. The swelling agent is then removed from said mixture by subjecting the same to a temperature of about 125° F.–150° F. and the resulting product is sheeted and formed into the desired shape, then cured in low pressure molds for approximately 1 hour and further heated in a graduated oven ranging from 150° F.–400° F. over a 24 hour period.

Instead of natural rubber, so-called "Buna-S" or "Buna-N" may be employed and when either of these is employed, xylol, for example, is used as the swelling agent. In any case, the resultant cured product includes a binder for the asbestos fibers which binder is a substantially dry infusible solid mass.

*Example XIX*

Instead of employing said materials as binders and frictional materials with asbestos for brake linings, said materials may be prepared in the form of comminuted materials and then incorporated in a binder for said asbestos and are retained in said binder as discrete particles. The binder employed may be any of those known to the art such as rubber, phenol-aldehyde resins, heat polymerized drying oils and the like or combinations of these or other materials heretofore used for this purpose.

A quantity of an allyl ether of cashew nut shell liquid may be heated between about 500° F. to 600° F. until just before solidification. Then it is poured into shallow pans and cured for 24 hours at about 300° F. to 400° F. After that period it will have been converted to the substantially dry, solid and infusible state and is a rubbery mass. This rubbery mass is then comminuted in any convenient manner, by using for example, differential rolls or a hammer mill. The mass is comminuted so that there is provided a relatively fine dust whose particle size is below about 20 mesh per square inch. This friction augmenting dust may be combined with the asbestos and binder therefor in the manner heretofore employed for the incorporation of dusts as components of a brake lining. The usual manner is to incorporate in a brake lining of asbestos fibers, 8 to 20% of dust based on the weight of the finished product, about double that amount of a binder, together with barytes, carbon black and other materials which may be used therewith.

Instead of using only the allyl ethers of an anacardic material to make said friction augmenting dusts, said ethers as well as the heat thickened products thereof may be modified in the same manner as they were in Examples XVII and XVIII and the following are specific illustrations of some of said modifications.

*Example XX*

100 parts of allyl ether of cashew nut shell liquid is heated between about 500° F.–600° F. until its viscosity has increased to between about 5,000 to 20,000 centipoises at 25° C. Then this thickened product is cooled to room temperature and then mixed with about 8 parts of paraformaldehyde and about 5 parts of diethyl sulphate until a substantially uniform mixture is obtained. This mix is placed in shallow pans in an oven at 250° F.–300° F. for 24 hours and the resulting product is a substantially dry, solid, tough, infusible mass which is then comminuted to a relatively fine dust, for example 20 mesh per square inch and may be incorporated in a brake lining in the manner heretofore set forth.

*Example XXI*

100 parts of the allyl ether of cashew nut shell liquid is heated to between 500° F.–600° F. until its viscosity has increased to between about 5,000 to 20,000 centipoises at 25° C. Then this thickened product is mixed with a solution consisting of a ratio of 1 part of a fusible thermosetting tertiary butyl phenol-formaldehyde resin and 4 parts of linseed oil. The quantity of said solution employed is preferably about 50 to 100 parts. Also added to said mixture may be a quantity of sulphur and preferably 2 to 20 parts. These components are mixed with each other until a substantially uniform mixture is obtained. The mass is then placed in shallow pans in an oven at about 250° F.–300° F. for 24 hours and the resultant product is a substantially solid dry infusible mass which is then comminuted to a relatively fine dust, for example, 20 mesh per square inch and may then be incorporated into a brake lining in a manner heretofore set forth.

The allyl ether of cashew nut shell liquid or of one of said distillates may be used advantageously in several fields, for example as a varnish or paint vehicle, an example of which is as follows:

216⅓ lbs. of allyl ether of cashew nut shell liquid
200 lbs. of China-wood oil
100 lbs. of gilsonite
6 lbs. of lead soligen drier
2 lbs. of manganese soligen drier
75 gals. of kerosene 75% of the allyl ether of cashew nut shell liquid and the China-wood oil are heated to 520° F. and held between 500° F. and 520° F. for desired body. When the proper body is reached, the fluxed pitch containing the remaining 25% of the allyl ether is added thereto. The mixture is then allowed to cool, thinned and driers added to cold varnish. This varnish may be spread and dried in several coats on fabric or metal. It may be either air dried or baked. The baking may be done at around 280° F.–300° F., the time depending on the amount of drier and the thickness of the coat. In general for baking, a time of cure around 20–30 minutes is sufficient.

The following is an example of use with a synthetic rubber:

100 parts "Buna-N" (rubbery copolymer of butadiene and acrylonitrile)
5 parts zinc oxide
40 parts "gastex" (carbon black)
1 part "agerite" (antioxidant)
1.5 parts "altax" (accelerator)
2 parts sulphur
40 parts allyl ether of cashew nut shell liquid are mixed together and cured for 30 minutes at 300° F. This gives a soft stock with high tensile strength and elongation.

This application is a continuation in part of my co-pending application Serial No. 541,850 filed June 23, 1944 and Serial No. 566,242 filed December 1, 1944.

Having thus described my invention, what I claim and desire to protect by Letters Patent is:

1. A resinous organic reaction product of (1) a material selected from the group consisting of formaldehyde, paraformaldehyde, hexamethylene tetramine, furfuraldehyde, trioxymethylene, glyoxal, acetaldehyde, acrolein and polymerized acrolein and (2) an aldehyde-reactive product produced by heating allyl ether of a liquid anacardic material selected from the group consisting of cashew nut shell liquid and its polymers, distillates of cashew nut shell liquid and their polymers, said distillates having a boiling point of approximately 225° C. at 10 mm. of mercury pressure, residues of cashew nut shell liquid obtained by heating cashew nut shell liquid until the quantity by weight of the residues is between 25% to 75% by weight of the cashew nut shell liquid and the polymers of said residues.

2. A resinous organic reaction product of (1) a material selected from the group consisting of formaldehyde, paraformaldehyde, hexamethylene tetramine, furfuraldehyde, trioxymethylene, glyoxal, acetaldehyde, acrolein and polymerized acrolein and (2) an aldehyde-reactive product produced by heating allyl ether of cashew nut shell liquid.

3. A resinous organic reaction product of (1) a material selected from the group consisting of formaldehyde, paraformaldehyde, hexamethylene tetramine, furfuraldehyde, trioxymethylene, glyoxal, acetaldehyde, acrolein and polymerized acrolein and (2) an aldehyde-reactive product produced by heating allyl ether of liquid polymerized cashew nut shell liquid.

4. A resinous organic reaction product of formaldehyde and an aldehyde-reactive resinous composition produced by heating allyl ether of cashew nut shell liquid.

5. A resinous organic reaction product of formaldehyde and an aldehyde-reactive resinous composition produced by heating allyl ether of liquid polymerized cashew nut shell liquid.

6. A resinous organic reaction product of hexamethylene tetramine and an aldehyde-reactive resinous composition produced by heating allyl ether of cashew nut shell liquid.

7. A resinous organic reaction product of hexamethylene tetramine and an aldehyde-reactive resinous composition produced by heating allyl ether of liquid polymerized cashew nut shell liquid.

8. A composition of matter produced by heating a combination comprising a heat polymerizing fatty oil and a resinous organic reaction product of (1) a material selected from the group consisting of formaldehyde, paraformaldehyde, hexamethylene tetramine, furfuraldehyde, trioxymethylene, glyoxal, acetaldehyde, acrolein and polymerized acrolein and (2) an aldehyde-reactive product produced by heating allyl ether of a liquid anacardic material selected from the group consisting of cashew nut shell liquid and its polymers, distillates of cashew nut shell liquid and their polymers, said distillates having a boiling point of approximately 225° C. at 10 mm. of mercury pressure, residues of cashew nut shell liquid obtained by heating cashew nut shell liquid until the quantity by weight of the residues is between 25% to 75% by weight of the cashew nut shell liquid and the polymers of said residues.

9. A friction element comprising asbestos and a substantially solid product produced by heating a combination comprising oil-soluble heat reactive phenol-aldehyde resin and a resinous organic reaction product of (1) a material selected from the group consisting of formaldehyde, paraformaldehyde, hexamethylene tetramine, furfuraldehyde, trioxymethylene, glyoxal, acetaldehyde, acrolein and polymerized carolein and (2) an aldehyde-reactive product produced by heating allyl ether of a liquid anacardic material selected from the group consisting of cashew nut shell liquid and its polymers, distillates of cashew nut shell liquid and their polymers, said distillates having a boiling point of approximately 225° C. at 10 mm. of mercury pressure, residue of cashew nut shell liquid obtained by heating cashew nut shell liquid until the quantity by weight of the residue is between 25% to 75% by weight of the cashew nut shell liquid and the polymers of said residues.

10. A friction element comprising asbestos and a substantially solid product produced by heating a combination comprising an oil-soluble heat reactive phenol-aldehyde resin, a heat polymerizing fatty oil and a resinous organic reaction product of (1) a material selected from the group consisting of formaldehyde, paraformaldehyde, hexamethylene tetramine, furfuraldehyde, trioxymethylene, glyoxal, acetaldehyde, acrolein and polymerized acrolein and (2) an aldehyde-reactive product produced by heating allyl ether of a liquid anacardic material selected from the group consisting of cashew nut shell liquid and its polymers, distillates of cashew nut shell liquid and their polymers, said distillates of cashew nut shell liquid having a boiling point of approximately 225° C. at 10 mm. of mercury pressure, residues of cashew nut shell liquid obtained by heating cashew nut shell liquid until the quantity by weight of the residues is between 25% to 75% by weight of the cashew nut shell liquid and the polymers of said residues.

11. A substantially solid product obtained by heating a resinous organic reaction product defined in claim 1.

12. A friction element comprising asbestos and a substantially solid product obtained by heating a resinous organic reaction product defined in claim 1.

13. A friction element comprising asbestos and a substantially solid product obtained by heating a composition of matter defined in claim 8.

MORTIMER T. HARVEY.

REFERENCES CITED

The following references are of record in the file of this patent:

UNITED STATES PATENTS

| Number | Name | Date |
|---|---|---|
| 1,838,074 | Harvey | Dec. 22, 1931 |
| 2,302,363 | Bellefontaine | Nov. 17, 1942 |